March 22, 1938.  S. C. MACKENZIE  2,112,108
COUPLING FOR CONVEYING ROTARY MOTION
Filed Oct. 6, 1936
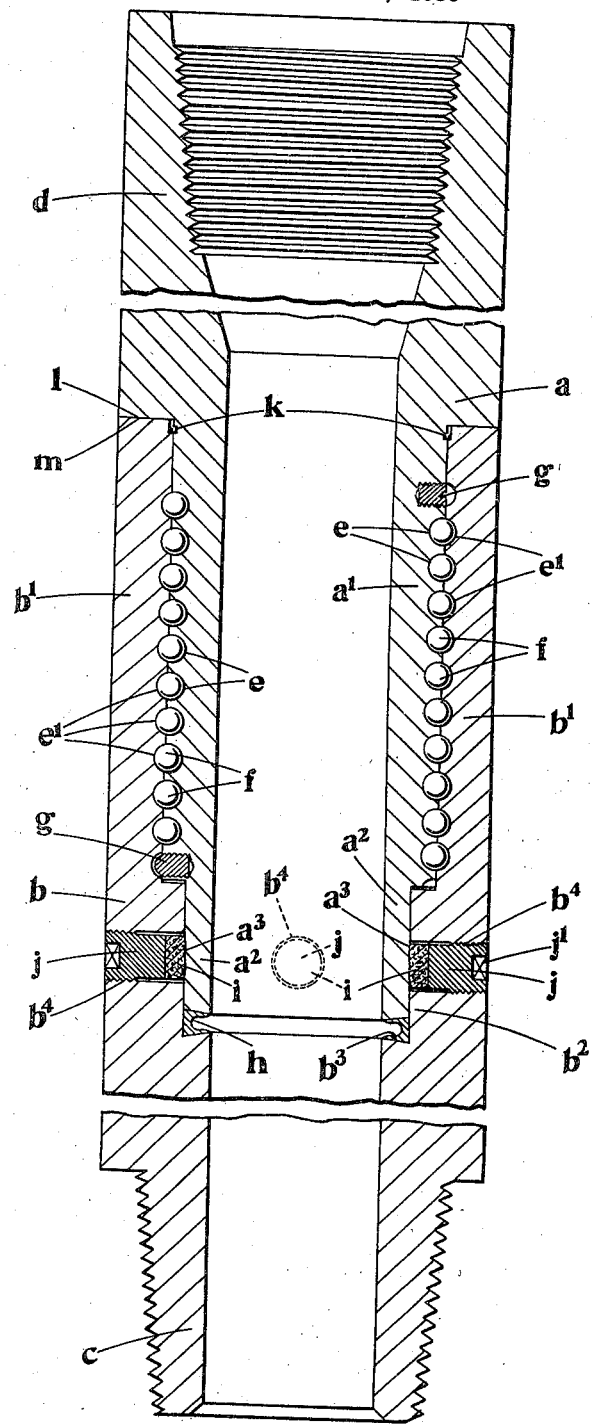
Inventor
S. C. Mackenzie
by
W. E. Evans
Attorney.

Patented Mar. 22, 1938

2,112,108

UNITED STATES PATENT OFFICE 2,112,108

COUPLING FOR CONVEYING ROTARY MOTION

Stanley Colman Mackenzie, Monkseaton, England

Application October 6, 1936, Serial No. 104,274
In Great Britain June 14, 1935

3 Claims. (Cl. 285—146)

This invention relates to couplings for the transmission of rotary motion, and is of especial application to well boring or fishing tools with respect to which it has for its object to provide a coupling or joint in which the parts are connected with a minimum of friction, whereby the coupling may be unscrewed before any other screw-threaded joint of usual form by which the main sections of the drill stem or the like are connected, and the invention has also among its objects to avoid or minimize the possibility of "freezing" of the joint in the drilling operations.

It will be understood that in the use of well boring or fishing tools it is not uncommon for the cutting bit or fishing tools to become stuck during the drilling or fishing operations. Thus if it prove impossible to free the tools it is necessary to withdraw from the bore hole or "back off" as much of the drill stem or tubing as possible before "washing over" the stuck tools, and it is necessary that the gear to be left in the bore hole be as short as possible.

The coupling or joint provided according to the invention is advantageously made at a position near the cutting tool or bit, such for example as between the drill collar (to the lower end of which the cutting tool may be connected) and the lowermost section of the drill stem, and the coupling or joint made at such a position, instead of being made of tubular parts that are screw-threaded for engagement one within the other as is usual, is made of such tubular parts upon and within which helical grooves of corresponding form and dimensions and of the same pitch are formed, one helical groove being provided upon the external surface of the inner part of the coupling, and the other helical groove on the internal periphery of the outer part thereof. The helical grooves upon the respective tubular parts of the coupling are thus complementary so that when brought together by the insertion of one part within the other, the respective helical grooves form a completely enclosed space of helical form and of a uniform circular shape in transverse cross-section, which is adapted for the reception of a series of balls of a corresponding size, which may thus serve in substitution of the usual helical screw-thread as the means by which one of the parts of the coupling may engage within the other on their relative rotation.

According to the invention moreover, the helical groove on the inner part of the coupling has a transverse cross-section which is slightly more than a semi-circle, whereby the balls used are adapted to be held therein and the inner part of the coupling is adapted to be introduced within the outer part by the relative rotation thereof in substantially the same manner as if the inner part were provided with an external helical thread of a usual form, it being understood that after the balls have been applied in the helical groove upon the external surface of the inner part to the number required to fill the helical groove, a screw-threaded plug may be applied in a radial position at the respective ends of the helical groove in order to retain the balls therein.

The invention comprises the constructional features which are hereinafter described.

The invention is illustrated by way of example in the accompanying drawing, which in longitudinal section represents a coupling or joint intended for use in well drilling operations.

In carrying the invention into effect in its application to a coupling or joint such as illustrated in the accompanying drawing, the coupling for use with well boring tools may be advantageously inserted between the drill collar at the lower end of which the cutting bit is carried, and the lowermost section of the drill stem, or the coupling may be applied in position immediately above the fishing tool. The coupling is conveniently made of two tubular parts $a$, $b$, one of which $b$ may be provided at its lower end with a tapered and externally screw-threaded plug fitting $c$, while the other $a$ is at the opposite end provided with a corresponding or complementary tapered and internally screw-threaded socket fitting $d$, and the respective parts $a$, $b$ are otherwise provided that for substantially the whole length of the completed coupling the internal diameter is uniform. The external diameter of the part $a$ of the coupling may be reduced at its inner end $a^1$ while the internal diameter of the outer part $b$ may be increased at the corresponding position $b^1$.

It will be understood that the inner and outer parts $a$, $b$ of the coupling are of cylindrical form and that the external face of the inner part $a$ is provided with a helical groove $e$ which as hereinbefore described may be provided of a transverse cross-section that is deeper or a little more than semi-circle whereby the deeper groove has a width at the periphery less than its maximum width, whereby the steel or other hard balls $f$ of a corresponding size are thus carried upon the inner part $a$ and the balls $f$ can be passed in from one or other end of the helical groove $e$, and retained in the groove by suitable means such as radially disposed screw-threaded plugs $g$. The outer part $b$ of the coupling is provided with a corresponding internal helical groove $e^1$ of the same pitch and diameter in circular cross-section as the helical groove $e$ formed on the inner part $a$, the respective helical grooves $e$, $e^1$ being complementary and coming into coincident positions as the inner part $a$ carrying the balls $f$ in its external helical groove is rotated relatively to the outer part $b$ to bring the parts into the relation indicated in the drawing. Thus the outwardly extending parts of the helical series of balls $f$ carried upon the inner part $a$ pass into the internal helical groove $e^1$ in the outer part $b$.

At the extreme end $a^2$ of the inner part $a$ of the coupling its external diameter may be further reduced for accommodation within it of the outer part $b$ at $b^2$ where its internal diameter is correspondingly increased, a shoulder $b^3$ being thus provided; while inasmuch as the narrow end face of the inner end $a^2$ of the inner part $a$ of the coupling does not extend into contact with the shoulder $b^3$, an annular space is thus provided for the accommodation of packing such for example as a rubber packing ring $h$ of a substantially U or other similar shape in cross-section, whereby the mud flush may not enter the ball race. Similar provision may be made at the opposite end of the respective parts adjacent the contact faces $l$, $m$ where a packing ring $k$ such as a U-leather having its annular cavity directed towards the opposed contact faces $l$, $m$ may be applied.

At equidistant positions on the outer part $b$ of the coupling adjacent the position at which the reduced end $a^2$ of the inner part extends, radial screw-threaded cylindrical holes $b^4$ are provided and in an adjacent position on the external surface of the reduced end $a^2$, the surface $a^3$ is coarsely knurled or similarly provided and circular friction pads $i$ of fibre or other similar material are inserted and are adapted to be applied with determined pressure, by means of externally screw-threaded plugs $j$ that are inserted within the radial holes. The outer faces of the screw-threaded plugs $j$ are advantageously provided with a square or other central recess $j^1$ adapted to accommodate the end of corresponding shape of a hand tool by which the screw-threaded plugs $j$ may be applied in position or withdrawn. In this way a determined amount of friction may be imposed between the friction pads $i$ and the friction surface $a^3$ where otherwise the manner of connection of the respective parts of the coupling by the helical series of balls might lead to unscrewing due to spinning in drilling or operation. The friction imposed is however such that the parts of the coupling will be unscrewed before the joints by which the respective sections or elements of the drill stem or the equivalent are connected together or to the coupling or by which the tool is connected to the coupling.

It will be understood that instead of providing the respective helical grooves $e$, $e^1$ so as to yield an enclosing helical space circular in transverse cross-section for the reception of the balls $f$, the enclosing helical space may have any other convenient transverse cross-sectional shape, such as a polygonal shape, the respective grooves being so formed and disposed that the groove on the inner part of the coupling is adapted to hold the balls within it; or again the respective complementary grooves may have a different transverse cross-sectional shape.

It also will be understood that instead of applying the balls within the helical groove upon the external face of the inner part of the coupling or joint, the balls may be applied so as to be similarly retained within the helical groove on the internal periphery of the outer part.

It will furthermore be understood that steel balls are preferably employed that are hardened and the respective parts of the coupling are advantageously provided of special tool steel that may be heat treated.

I claim:
1. A coupling for transmitting rotary motion comprising a member having an axial bore and a member having a part adapted to extend axially into said bore, the first-mentioned member having a helical groove on its inner periphery and the second-mentioned member having a helical groove on its outer periphery, said grooves being complementary one to the other and being of the same pitch and forming together a helical channel when the parts are coupled, one of said grooves being deeper than the other and closed at its ends and having a width at the peripheral surface of the member in which it is formed less than its maximum width, and a helical series of balls within the deeper helical groove, each ball having a diameter greater than the width of the latter groove at the peripheral surface of the member in which it is formed, whereby the balls are retained in said deeper groove when the members are separated and extend into the complementary groove when the members are being coupled.

2. A coupling for transmitting rotary motion comprising a member having an axial bore and a member having a part adapted to extend axially into said bore, the first-mentioned member having a helical groove on its inner periphery and the second-mentioned member having a helical groove on its outer periphery, said grooves being complementary one to the other and being of the same pitch and forming together a helical channel when the parts are coupled, one of said grooves being deeper than the other and closed at its ends and having a width at the peripheral surface of the member in which it is formed less than its maximum width, a helical series of balls within the deeper helical groove, each ball having a diameter greater than the width of the latter groove at the peripheral surface of the member in which it is formed, whereby the balls are retained in said deeper groove when the members are separated and extend into the complementary groove when the members are being coupled and a friction applying device on one member engaging the other member to prevent free relative rotation of said members when they are coupled.

3. A coupling for transmitting rotary motion comprising a member having an axial bore and a member having a part adapted to extend axially into said bore, the first-mentioned member having a helical groove on its inner periphery and the second-mentioned member having a helical groove on its outer periphery, said grooves being complementary one to the other and being of the same pitch and forming together a helical channel when the parts are coupled, the groove in the second-mentioned member being closed at its ends and deeper than the groove in the first-mentioned member and having a width at the peripheral surface of the second member which is less than its maximum width and a helical series of balls within the deeper helical groove, each ball having a diameter greater than the width of the latter groove at the peripheral surface of the member in which it is formed, whereby the balls are retained in said deeper groove when the members are separated and extend into the complementary groove when the members are being coupled.

STANLEY COLMAN MACKENZIE.